United States Patent
Hildebrand

(10) Patent No.: US 11,989,435 B2
(45) Date of Patent: May 21, 2024

(54) RE-PARTITIONING OF A FLASH MEMORY DEVICE

(71) Applicant: Elektrobit Automotive GmbH, Erlangen (DE)

(72) Inventor: Uwe Hildebrand, Fürth (DE)

(73) Assignee: Elektrobit Automotive GmbH, Erlangen (DE)

( * ) Notice: Subject to any disclaimer, the term of this patent is extended or adjusted under 35 U.S.C. 154(b) by 0 days.

(21) Appl. No.: 17/745,398

(22) Filed: May 16, 2022

(65) Prior Publication Data

US 2022/0365696 A1    Nov. 17, 2022

(30) Foreign Application Priority Data

May 17, 2021   (EP) ..................................... 21174070

(51) Int. Cl.
*G06F 3/06*   (2006.01)
(52) U.S. Cl.
CPC .......... *G06F 3/0644* (2013.01); *G06F 3/0604* (2013.01); *G06F 3/0656* (2013.01); *G06F 3/0679* (2013.01)
(58) Field of Classification Search
CPC .... G06F 3/0644; G06F 3/0604; G06F 3/0656; G06F 3/0679
See application file for complete search history.

(56) References Cited

U.S. PATENT DOCUMENTS

| | | | |
|---|---|---|---|
| 2008/0082736 A1 | 4/2008 | Chow et al. | |
| 2010/0050053 A1* | 2/2010 | Wilson | G06F 11/1068 714/E11.038 |
| 2018/0211044 A1 | 7/2018 | Lv | |
| 2018/0225176 A1* | 8/2018 | Kim | G06F 12/0873 |
| 2018/0329775 A1 | 11/2018 | Wong | |
| 2018/0336127 A1* | 11/2018 | Hutchison | G06F 12/0246 |
| 2020/0081829 A1* | 3/2020 | Bradshaw | G06F 3/0679 |
| 2020/0226069 A1* | 7/2020 | Kaburaki | G06F 3/0659 |
| 2020/0247424 A1 | 8/2020 | Dudar | |
| 2022/0070006 A1* | 3/2022 | Jetzfellner | H04L 9/3236 |
| 2022/0217000 A1* | 7/2022 | Seaborn | H04L 9/3247 |

FOREIGN PATENT DOCUMENTS

| | | |
|---|---|---|
| CN | 106528249 A | 3/2017 |
| CN | 109408153 A | 3/2019 |
| CN | 111614764 A | 9/2020 |
| CN | 112306368 A | 2/2021 |

OTHER PUBLICATIONS

Search Report dated Oct. 27, 2021 from corresponding European patent application No. 21174070.9.
European Examination Report dated Jan. 31, 2024 from corresponding European patent application No. 21174070.9.

* cited by examiner

*Primary Examiner* — Mark A Giardino, Jr.

(57) ABSTRACT

A flash memory device is re-partitioned over-the-air. A software component responsible for re-partitioning is received. The software component then generates a re-partitioning control structure in the flash memory device and executes re-partitioning steps. The executed re-partitioning steps and currently valid locations of data that needs to be moved in the flash memory device during re-partitioning are recorded in the re-partitioning control structure.

20 Claims, 5 Drawing Sheets

| Magic Pattern |
|---|
| RCS Version |
| RCS Size |
| Status |
| Progress |
| BTT Entries (=n) |
| BTT Original_Start_Location[0] |
| BTT Original_End_Location[0] |
| BTT Mapped_Start_Location[0] |
| ... |
| BTT Original_Start_Location[n-1] |
| BTT Original_End_Location[n-1] |
| BTT Mapped_Start_Location[n-1] |
| CRC Checksum |
| HMAC (optional) |

FIG. 7

RE-PARTITIONING OF A FLASH MEMORY DEVICE

BACKGROUND

The present invention is related to a method, a computer program code, and an apparatus for re-partitioning a flash memory device, in particular for re-partitioning a flash memory device over-the-air.

Many products are equipped with an embedded flash memory device, e.g. an eMMC (embedded Multi-Media Card) flash device. Unfortunately, it is difficult to predict future demands on the flash footprint with regard to flash partitions or sub-partitions that may be needed by future new or changed product features. Consequently, re-partitioning of a flash memory device may be required even after the product has already been released to the market.

In this regard, CN 112306368 A discloses a method for expanding user data partitions on eMMC. The physical addresses of the user data partition and a built-in video partition are pre-arranged to be adjacent. When the capacity of the user data partition needs to be expanded, the partition information of the user data partition and the partition information of the built-in video partition are modified according to the capacity to which the user data partition needs to be expanded. In accordance with the modified partition information, the file system information is modified to form an expanded user data partition and a reduced built-in video partition.

Re-partitioning of a flash device in a product is generally not done over-the-air, but rather in a safe environment, e.g. using a connected host that performs a kind of emergency software update. With such a setup, also in case of errors during re-partitioning, it is always possible to recover the system and eventually obtain a working re-partitioned system.

Being forced to perform an emergency software update in a safe environment, e.g. in a garage in case of automotive systems, for achieving re-partitioning of an embedded flash memory device is a significant cost factor. This is particularly the case for products that are already in the field and have been delivered to end customers.

It is an object of the present invention to provide a secure and failure-proof solution for re-partitioning a flash memory device outside a safe environment, e.g. using an over-the-air approach.

BRIEF SUMMARY

This object is achieved by a method according to claim 1, by a computer program code according to claim 13, which implements this method, and by an apparatus according to claim 14. The dependent claims include advantageous further developments and improvements of the present principles as described below.

According to a first aspect, a method for re-partitioning a flash memory device comprises the steps of:
- receiving a software component responsible for re-partitioning;
- generating a re-partitioning control structure in the flash memory device;
- executing re-partitioning steps; and
- recording the executed re-partitioning steps and currently valid locations of data that needs to be moved in the flash memory device during re-partitioning in the re-partitioning control structure.

Accordingly, a computer program code comprises instructions, which, when executed by at least one processor, cause the at least one processor to perform the following steps for re-partitioning a flash memory device:
- receiving a software component responsible for re-partitioning;
- generating a re-partitioning control structure in the flash memory device;
- executing re-partitioning steps; and
- recording the executed re-partitioning steps and currently valid locations of data that needs to be moved in the flash memory device during re-partitioning in the re-partitioning control structure.

The term computer has to be understood broadly. In particular, it also includes electronic control units, embedded devices and other processor-based data processing devices.

The computer program code can, for example, be made available for electronic retrieval or stored on a computer-readable storage medium.

According to another aspect, an apparatus for re-partitioning a flash memory device comprises:
- an interface configured to receive a software component responsible for re-partitioning; and
- a processing device configured to generate a re-partitioning control structure in the flash memory device, to execute re-partitioning steps, and to record the executed re-partitioning steps and currently valid locations of data that needs to be moved in the flash memory device during re-partitioning in the re-partitioning control structure.

According to the invention, the re-partitioning of the flash memory device is carried out by an updated software component, which can be installed on the target system via a standard over-the-air software update. Typically, this software component to be updated implements the flash memory device driver or the flash memory device server that manages flash memory accesses in the system. In a virtualized system, this software component will typically be a hypervisor, which then includes a flash memory device server. This updated software component will usually be the only new software component that is updated at this stage, as the purpose of this first update cycle is only to separate flash re-partitioning from functional changes, e.g. feature increases, that will be provided by a subsequent software update cycle and that require a different flash partitioning. The new features will then be introduced by a second standard software update, once re-partitioning is completed. It shall be noted that no software update should be accepted or executed while a flash re-partitioning task is ongoing.

In order to support re-partitioning, compared to its normal functionality the updated software component contains a dedicated re-partitioning function that controls the execution of steps to be performed for actually re-partitioning the flash memory device. The re-partitioning steps that are executed comprise copying data from an original location to a buffer, copying data from the buffer to a target location, and updating content of a partition table. Furthermore, the updated software component contains support for a re-partitioning control structure, which is used to keep track of the executed steps during re-partitioning and the currently valid locations of data that needs to be moved around on the flash memory device during the re-partitioning steps. For all steps within a re-partitioning cycle, the re-partitioning control structure is kept updated and stored on the flash memory device. The partition tables stored on the flash memory device together with the up-to-date re-partitioning control structure stored on the flash memory device always give a valid view on all partitions and sub-partitions and enable resumption and completion of an interrupted re-partitioning cycle. In case of errors or power-loss failure during an ongoing re-partitioning operation, it is always possible to resume and finish the interrupted re-partitioning of the flash memory device.

The solution according to the invention allows performing re-partitioning of an embedded flash memory device of a system in a product in the field, only relying on an over-the-air software update functionality. In this way, expensive updates in a safe environment are avoided. The described solution is safe even for flash partitions or sub-partitions that are not stored redundantly on the flash memory device.

Instead of an implementation where the re-partitioning steps are defined offline and explicitly coded and finally become part of a compiled managing software component, these re-partitioning steps may also be determined online by the managing software component based on differences between current partition tables and new target partition tables, which are delivered with the compiled managing software component.

The locations of the re-partitioning control structure and the buffer on the flash memory device can either be hard-coded in the managing software component or they may be defied by a known predefined entry of a partition table. Also fixed locations on the flash memory device, which are not referred to by any entry of a partition table, may be used.

In an advantageous embodiment, two copies of the re-partitioning control structure are generated in the flash memory device. This allows supporting a safe way of recovery, i.e., resuming of an ongoing re-partitioning task that has been interrupted by an error or a power failure. In this way, the re-partitioning operation is more robust.

In an advantageous embodiment, the currently valid locations are recorded in a block translation table of the re-partitioning control structure. In addition to indicating the progress of an ongoing re-partitioning task, the re-partitioning control structure preferably contains a block translation table for re-mapping of logical blocks or sector numbers. If data are copied on the flash memory device from one location to another, then this block translation table enables correct access to moved data even when the partition tables have not yet been updated. For this purpose, the block translation table comprises information for translating a first range of logical blocks as described by an entry of a partition table to a second range of logical blocks that will be used by a low-layer driver of the flash memory device for actual flash accesses while a re-partitioning sequence is ongoing. A main purpose of a block translation table is to allow intermediate storage of data to be moved on the flash memory device because the new target location is not free and a direct transfer to the target location is not possible. As such, the block translation includes translations for intermediate steps of copying data to buffer and for final steps of copying data to an actual target location.

In an advantageous embodiment, the first range of logical blocks and the second range of logical blocks are located in different physical partitions of the flash memory device. The described solution using a block translation table can be used to change any software-defined partitioning within a physical user partition of the flash memory device or in general within a physical partition of the flash memory device. If data on the flash memory device shall be moved between physical partitions, e.g. from the physical user partition to a physical boot partition, then this cannot be handled with a simple sector number translation, as the driver of the flash memory device would need to address a different physical partition. However, with an extended block translation table and a more complex handling by the managing software component, e.g. the flash memory device driver or server, also support of arbitrary re-partitioning across physical partitions can be achieved. In addition, some level of data transfer between physical partitions can also be handled without the need for an extended block translation table, like copying a partition or sub-partition from one physical partition to free space in another physical partition. This is possible as no block translation table is required, and data can directly be copied to the free target location.

In an advantageous embodiment, the re-partitioning steps are executed as a background task or in an initialization function of the software component. Advantageously, the actual re-partitioning of the flash memory device is done as a background task while the system is operational, meaning that data on the flash memory device may need to be shuffled around while system functionality is still provided. The only limitation is that while each individual step is executed, any other access to the flash memory device is blocked. Due to stepwise approach, the duration of the steps and gaps between those steps can be dimensioned such that system operation is not impacted too much during re-partitioning. If desired, the re-partitioning can alternatively be executed in an initialization function of the managing software component, e.g. the flash memory device driver or server. This requires that the system can tolerate an increased start-up time, as execution of the initialization function will take longer.

In an advantageous embodiment, the re-partitioning control structure is protected by a keyed-hash message authentication code. Such a protection of the re-partitioning control structure on the flash memory device by a keyed-hash message authentication code may be employed for security reasons.

In an advantageous embodiment, the software component responsible for re-partitioning includes all modified partition tables that need to replace the ones stored on flash memory device before starting the re-partitioning. The described solution does not require that partition tables, which are stored on the flash memory device and describe the applied partition/sub-partition layout are defined, and handled themselves as updateable items of the system. Instead, the software component responsible for re-partitioning includes all partition tables that need to be replaced on the target system to describe the re-partitioned flash memory device. If the partition tables stored on the flash memory device are signed, then also the target partition tables included in the software component are correctly signed. The partition tables may be globally unique identifier (GUID) partition tables.

In an advantageous embodiment, the flash memory device is a managed NAND device. Managed NAND flash devices are well suited for implementing the described solution. In such flash memory devices, a block or sector oriented access to the flash memory is implemented for read, write and, if necessary, also erase accesses, which is advantageous when block translation tables shall be used. Ideally, the same range size is used for all access types, e.g. always based on a sector or block size of 512 bytes. This may be provided either by the flash memory device itself or by a lower software driver layer. Examples of managed NAND devices include embedded Multi-Media Card flash devices, UFS (Universal Flash Storage) flash devices, memory cards, e.g. MMC (Multi-Media Card) or SD (Secure Digital), and hard disk drives.

In an advantageous embodiment, the flash memory device is an embedded Multi-Media Card flash device. Those flash devices are used as embedded flash memory devices for many applications, e.g. in automotive applications.

Advantageously, a vehicle comprises an apparatus according to the invention or is configured to perform a method according to the invention for re-partitioning a flash memory device of the vehicle. For example, the flash memory device may be an embedded Multi-Media Card flash device comprised in a device used for navigation, infotainment, communication, or autonomous driving.

Further features of the present invention will become apparent from the following description and the appended claims in conjunction with the figures.

BRIEF DESCRIPTION OF THE DRAWINGS

FIG. 7 schematically illustrates an example of layout and content of the re-partitioning control structure.

DETAILED DESCRIPTION

Figure 1:
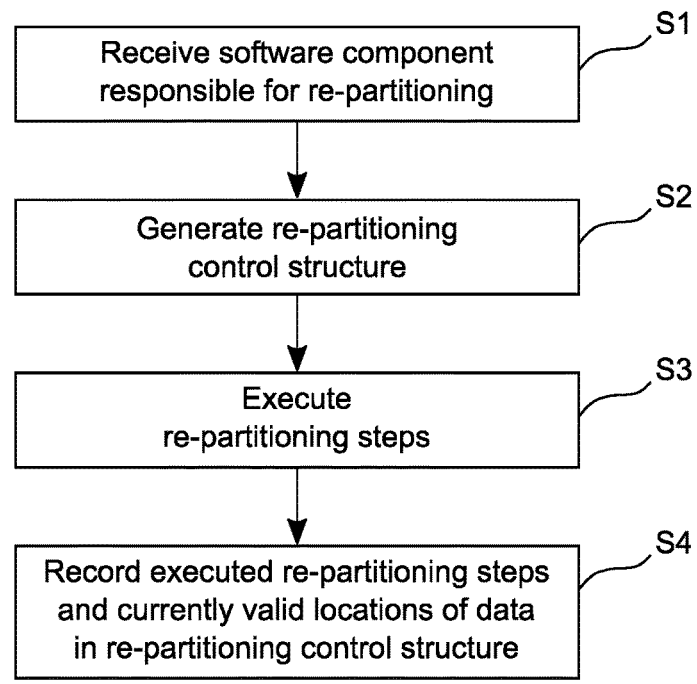
FIG. 1 schematically illustrates a method for re-partitioning a flash memory device.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, systems on a chip, microcontrollers, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a combination of circuit elements that performs that function or software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

FIG. 1 schematically illustrates a method according to the invention for re-partitioning a flash memory device. For example, the flash memory device may be a managed NAND device, e.g. an embedded Multi-Media Card flash device. In a first step, a software component responsible for re-partitioning is received S1. The software component then generates S2 a re-partitioning control structure in the flash memory device and executes S3 re-partitioning steps. The re-partitioning control structure may be protected by a keyed-hash message authentication code. Advantageously, two copies of the re-partitioning control structure are generated in the flash memory device. The re-partitioning steps, which may comprise copying data from an original location to a buffer, copying data from the buffer to a target location, and updating content of a partition table, for example, are preferably executed S3 as a background task or in an initialization function of the software component. The executed re-partitioning steps and currently valid locations of data that needs to be moved in the flash memory device during re-partitioning are recorded S4 in the re-partitioning control structure. For example, the currently valid locations may be recorded in a block translation table of the re-partitioning control structure, which comprises information for translating a first range of logical blocks as described by an entry of a partition table to a second range of logical blocks that will be used by a low-layer driver of the flash memory device for actual flash accesses while a re-partitioning sequence is ongoing. The first range of logical blocks and the second range of logical blocks may be located in different physical partitions of the flash memory device. Advantageously, the software component responsible for re-partitioning includes partition tables that need to be replaced. If necessary, these partition tables may be signed.

Figure 2:
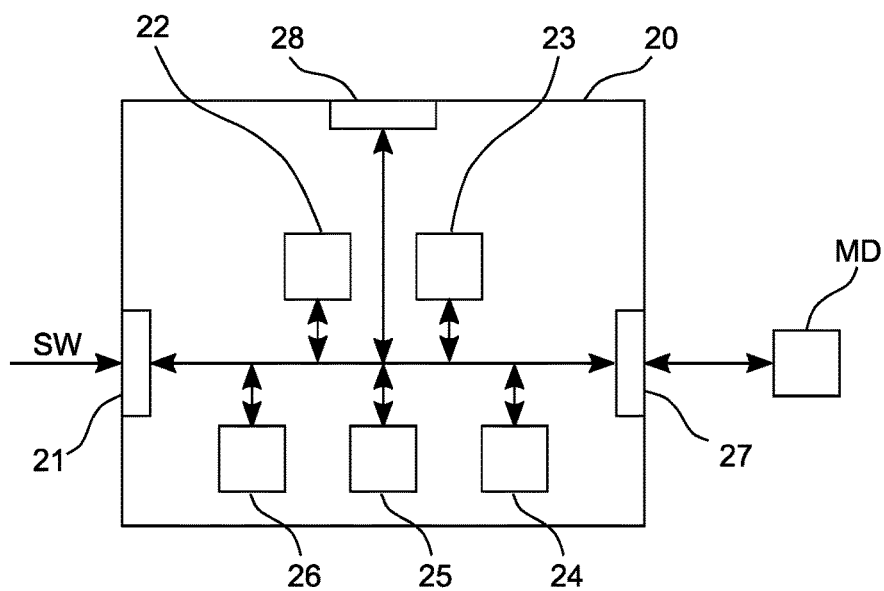
FIG. 2 schematically illustrates a first embodiment of an apparatus for re-partitioning a flash memory device.

FIG. 2 schematically illustrates a block diagram of a first embodiment of an apparatus 20 according to the invention for re-partitioning a flash memory device MD. For example, the flash memory device MD may be a managed NAND device, e.g. an embedded Multi-Media Card flash device.

The apparatus 20 has a first interface 21, via which an input module 22 receives a software component SW responsible for re-partitioning. The apparatus 20 further has a re-partitioning module 23 configured to execute re-partitioning steps. Preferably, the re-partitioning module 23 is configured to execute the re-partitioning steps, which may comprise copying data from an original location to a buffer, copying data from the buffer to a target location, and updating content of a partition table, for example, as a background task or in an initialization function of the software component SW. A re-partitioning control module 24 is configured to generate a re-partitioning control structure in the flash memory device MD and to record the executed re-partitioning steps and currently valid locations of data that needs to be moved in the flash memory device MD during re-partitioning in the re-partitioning control structure. For example, the currently valid locations may be recorded in a block translation table of the re-partitioning control structure, which comprises information for translating a first range of logical blocks as described by an entry of a partition table to a second range of logical blocks that will be used by a low-layer driver of the flash memory device MD for actual flash accesses while a re-partitioning sequence is ongoing. The first range of logical blocks and the second range of logical blocks may be located in different physical partitions of the flash memory device MD. Advantageously, the software component SW responsible for re-partitioning includes partition tables that need to be replaced. If necessary, these partition tables may be signed. The re-partitioning control structure may be protected by a keyed-hash message authentication code. Advantageously, the re-partitioning control module 24 is configured to generate two copies of the re-partitioning control structure in the flash memory device MD. In this example, the re-partitioning module 23 and the re-partitioning control module 24 access the flash memory device MD via a second interface 27. The first interface 21 may also be combined with the second interface 27 into a single interface. A local storage unit 26 is provided, e.g. for storing data during processing.

The input module 22, the re-partitioning module 23, and the re-partitioning control module 24 may be controlled by a control module 25. A user interface 28 may be provided for enabling a user to modify settings of the various modules 22-25. The modules 22-25 of the apparatus 20 can be embodied as dedicated hardware units. Of course, they may likewise be fully or partially combined into a single unit or implemented as software running on a processor, e.g. a CPU or a GPU.

Figure 3:
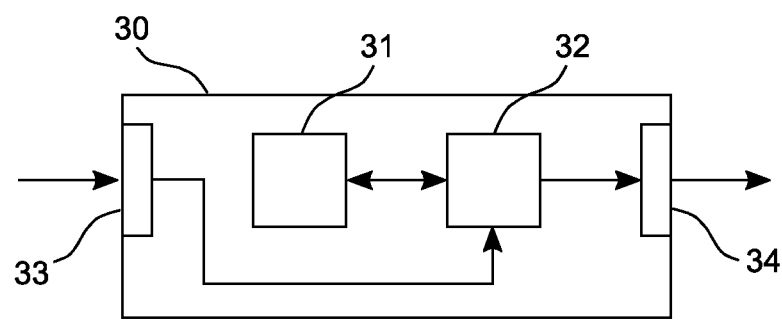
FIG. 3 schematically illustrates a second embodiment of an apparatus for re-partitioning a flash memory device.

A block diagram of a second embodiment of an apparatus 30 according to the invention for re-partitioning a flash memory device is illustrated in FIG. 3. The apparatus 30 comprises a processing device 32 and a memory device 31. For example, the apparatus 30 may be a computer, an electronic control unit or an embedded system. The memory device 31 has stored instructions that, when executed by the processing device 32, cause the apparatus 30 to perform steps according to one of the described methods. The instructions stored in the memory device 31 thus tangibly embody a program of instructions executable by the processing device 32 to perform program steps as described herein according to the present principles. The apparatus 30 has an input 33 for receiving data. Data generated by the processing device 32 are made available via an output 34. In addition, such data may be stored in the memory device 31. The input 33 and the output 34 may be combined into a single bidirectional interface.

The processing device 32 as used herein may include one or more processing units, such as microprocessors, digital signal processors, or a combination thereof.

The local storage unit 26 and the memory device 31 may include volatile and/or non-volatile memory regions and storage devices such as hard disk drives, optical drives, and/or solid-state memories.

Figure 4:
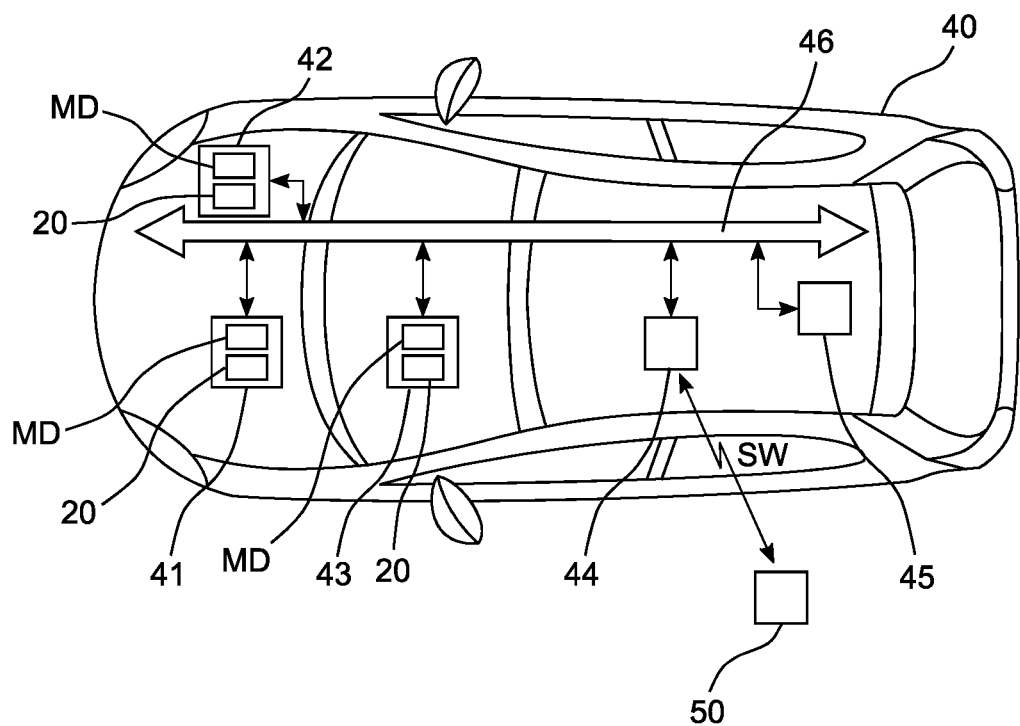
FIG. 4 schematically illustrates a motor vehicle in which a solution according to the invention is implemented.

FIG. 4 schematically shows a motor vehicle 40, in which a solution in accordance with the invention is implemented. The motor vehicle 40 has an autonomous driving controller 41, a navigation system 42 and an infotainments system 43, which in this example all have an embedded flash memory device MD. For each flash memory device MD, a dedicated apparatus 20 for re-partitioning the flash memory device MD is provided. By means of a data transmission unit 44, a connection to a backend 50 can be established, e.g. to receive a software component SW responsible for re-partitioning. A memory 45 is available for storing data. The data exchange between the different components of the motor vehicle 40 takes place via a network 46.

In the following, further details of the invention shall be given with reference to FIG. 5 to FIG. 8.

Figure 5:
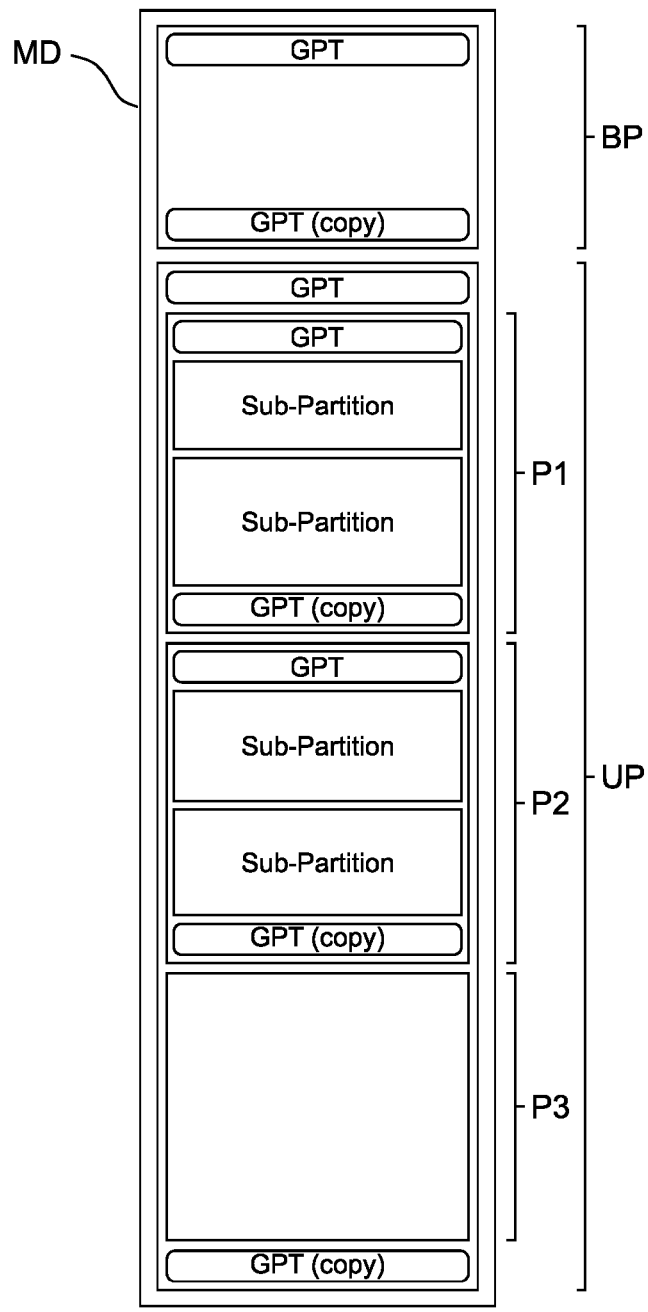
FIG. 5 schematically illustrates a currently applied partitioning of a flash memory device as used by a running system.

FIG. 5 schematically illustrates a currently applied partitioning of a flash memory device MD as used by a running system. The depicted flash memory device MD has two physical partitions, i.e., a boot partition BP and a user partition UP. Of course, further physical partitions may be present. The user partition UP is further partitioned by software in three software partitions P1-P3, which may each be assigned to a virtual machine in a virtualized environment. As shown for the first two software partitions P1, P2, the software partitions may be further partitioned into sub-partitions. The third software partition P3 may, for example, serve as an update partition that is only temporarily used for storage during a software update cycle. Each physical partition BP, UP has a corresponding partition table GPT at its beginning and a copy of that partition table GPT at its end, which specify the content/layout of each partition BP, UP. If software partitions P1, P2 within a physical partition UP are further sub-partitioned, then again each of those software partitions P1, P2 has a corresponding partition table GPT at its beginning and a copy of that partition table GPT at its end, describing the content/layout of the sub-partitioned partition P1, P2.

Figure 6:
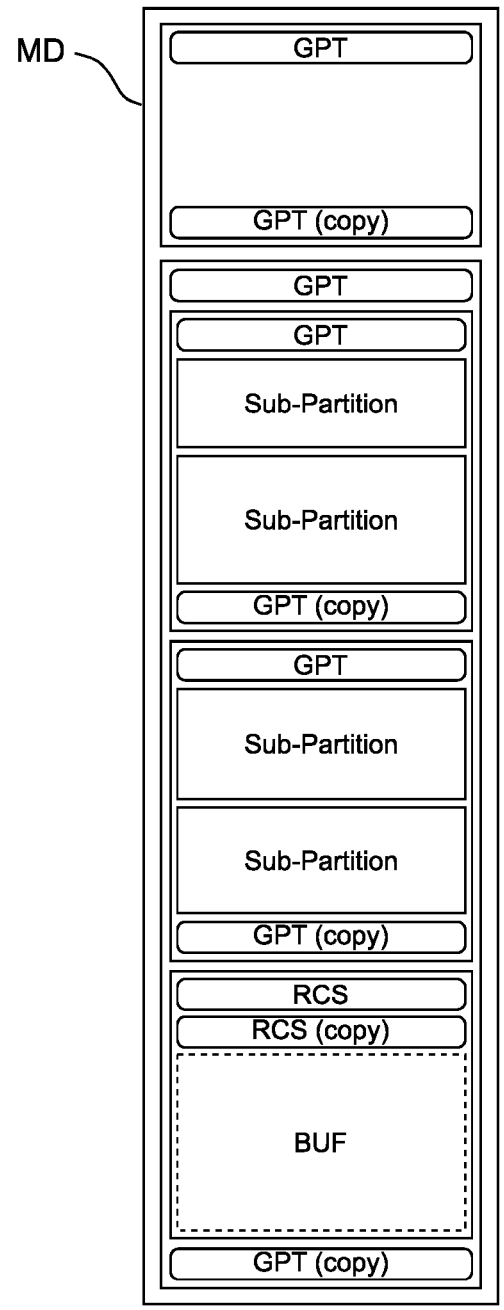
FIG. 6 schematically illustrates locations of a re-partitioning control structure and a buffer used during re-partitioning of the flash memory device of FIG. 5.

FIG. 6 schematically illustrates locations of a re-partitioning control structure RCS and a buffer BUF used during re-partitioning of the flash memory device MD of FIG. 5. During re-partitioning, a certain amount of data on the flash memory device MD needs to be transferred from an original location to a target location. Such data may be actual content of a partition or an instance of a partition table GPT.

As shown in FIG. 6, the third software partition P3, which is only temporarily used as a software update partition, may be used to store the re-partitioning control structure RCS and a copy of the re-partitioning control structure RCS. The third software partition P3 may further serve as a buffer BUF for data to be relocated while performing re-partitioning. In principle, any free space on the flash memory device MD can be used for this purpose, as long as this space will not be occupied by the re-partitioned layout and as long as the location is known to the software component managing the re-partitioning steps. The size of this free space just needs to be sufficiently large to store two copies of the re-partitioning control structure RCS and to provide a reasonable buffer BUF for transferring data.

It is advantageous to have the data currently being relocated on the flash memory device MD stored in two locations in parallel as well as having two copies of the re-partitioning control structure RCS being stored on the flash memory device MD, as this allows supporting a safe way of recovery, i.e., resuming of an ongoing re-partitioning task that has been interrupted by an error or a power failure.

The actual re-partitioning task is carried out as a sequence of steps that are tracked by the managing software component, e.g., the flash memory device MD server, by means of the re-partitioning control structure RCS. Several sub-functions used within these steps can be distinguished, which include starting re-partitioning and initializing data structures, copying data from the original location to the buffer BUF, copying data from the buffer BUF to the target location, updating content of a partition table GPT, and finalizing re-partitioning. Copying data and updating content of a partition table GPT may need to be executed several times, depending on the available size of the buffer BUF and on the amount of data that needs to be changed or relocated.

FIG. 7 schematically illustrates an example of layout and content of the re-partitioning control structure RCS. The re-partitioning control structure RCS begins with a magic pattern, followed by information on the version and the size of the re-partitioning control structure RCS. A Status indicator is used for specifying whether the re-partitioning control structure RCS is valid or invalid. A Progress counter is used for tracking progress of the re-partitioning operation. A number of BTT entries are used for defining a mapping or block translation. Each BTT entry designates a range of subsequent flash block addresses, e.g., sector numbers, from BTT Original_Start_Location[i] up to and including Original_End_Location[i] and its translation to a range of subsequent flash block addresses of the same size, starting from BTT Mapped_Start_Location[i]. Basically, the BTT entries translate a range of logical blocks/sectors as described by an entry of a partition table to another range of sectors that will be used by a low-layer driver of the flash memory device for actual flash accesses. One purpose of the block translation table BTT is to allow intermediate storage of data to be moved on the flash memory device because the new target location is not free and a direct transfer to the target location is not possible. The re-partitioning control structure RCS ends with a cyclic redundancy check (CRC) checksum. Optionally, for security reasons the re-partitioning control structure RCS may be protected by a keyed-hash message authentication code (HMAC).

Figure 8:
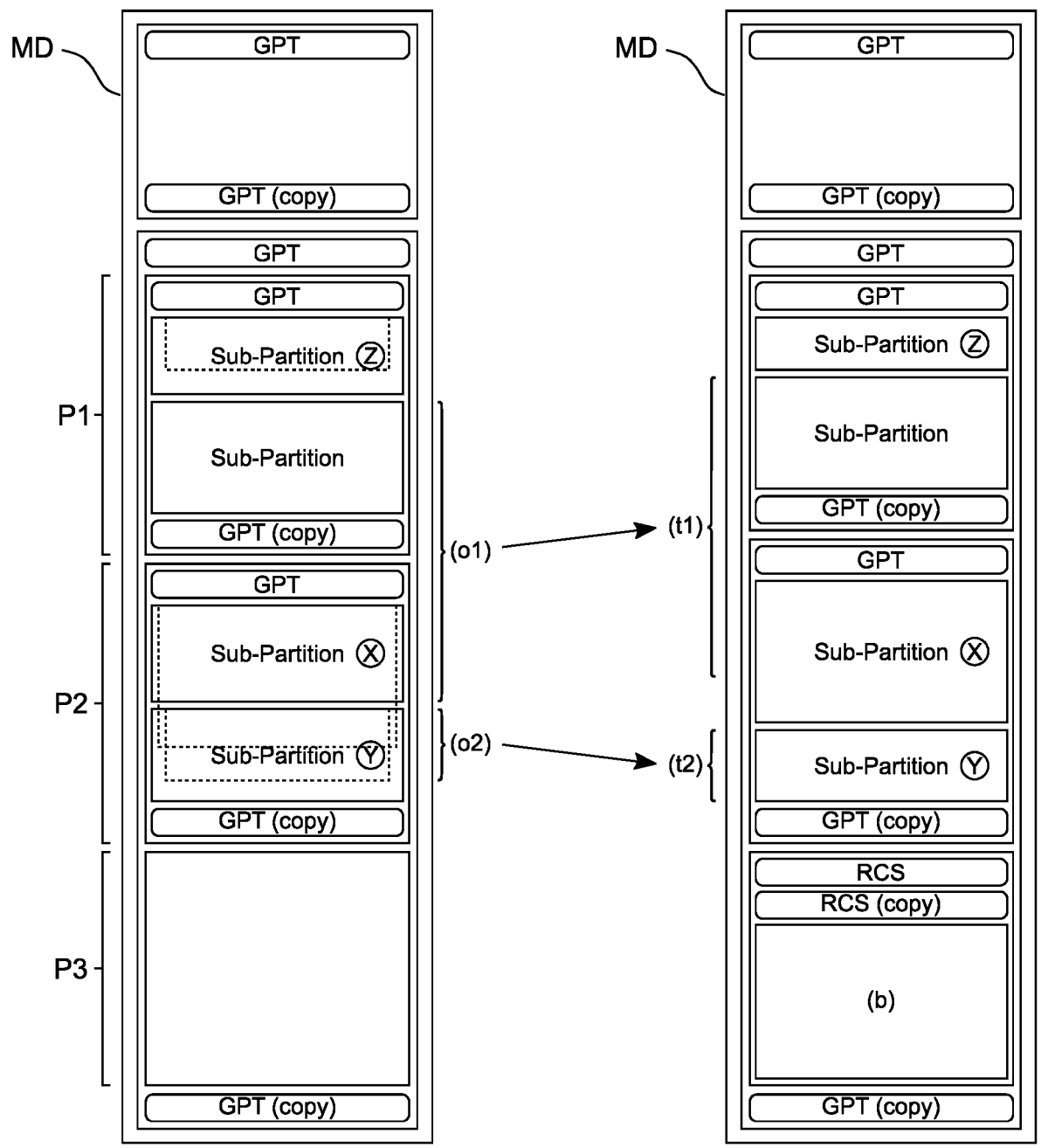
FIG. 8 schematically illustrates an example of a re-partitioning operation.

In the following, the re-partitioning steps to be carried out by the managing software component are described in more detail for an exemplary re-partitioning operation, which is schematically illustrated in FIG. 8. The task is to increase the size of partition X. In order to make space available for the increased partition X, the sizes of partitions Y and Z need to be decreased to the size indicated by the dashed rectangles. Obviously, the partitions Y and Z are considered to contain unused space, allowing reducing their sizes. In the described example, the software update partition P3 will be used to store the two copies of the re-partitioning control structure RCS and as buffer BUF for relocating flash content, where (b) in FIG. 8 designates the remaining available space in partition P3 usable as buffer BUF.

During re-partitioning, the managing software component can work with a working copy of the re-partitioning control structure RCS in RAM to reduce flash read and write accesses, but actual flash accesses are needed when the re-partitioning control structure RCS and/or the copy of the re-partitioning control structure RCS have to be written to the flash memory device MD, if required and stated in the steps below. Furthermore, the re-partitioning control structure RCS and the copy of the re-partitioning control structure RCS need to be read from the flash memory device MD whenever re-partitioning shall be started or resumed, e.g., after interruption due to an error or power failure, in order to obtain the latest up-to-date state persisting on the flash memory device MD.

Whenever the re-partitioning control structure RCS and the copy of the re-partitioning control structure RCS are read from the flash memory device MD, both copies are checked for integrity. This includes checking for a valid magic pattern and version of the re-partitioning control structure RCS, validation of the CRC checksum and HMAC validation, if applied. In case both copies are valid and for both the Status value is set to "valid", then the copy with the higher value of the Progress counter is used.

If a reset or power failure happens during any of the following steps, then the re-partitioning control structure RCS and the copy of the re-partitioning control structure RCS will be read from the flash memory device MD and evaluated as described above. Then the re-partitioning sequence will be continued according to the saved Progress value.

In the present exemplary embodiment, the managing software component implements the following re-partitioning steps:

1. Start or resume re-partitioning task if not already completed:
   a. if at least one of the copies of the re-partitioning control structure RCS has been successfully validated and its status value is set to "completed", then skip all further steps
   b. if no re-partitioning control structure RCS was found on the flash memory device, or if none of the copies of the re-partitioning control structure RCS that have been found has been successfully validated, then create an initial re-partitioning control structure RCS (in RAM) with an empty block translation table, the Progress value set to 0, and the Status value set to "valid"
   c. if at least one of the copies of the re-partitioning control structure RCS has been successfully validated and its status value is set to "valid", then use the RCS values of the RCS instance with the higher Progress value; continue with next step (step 2).
2. If Progress <1, then:
   a. copy content of (o1*) to (b), with (o1*) being the first part of (o1) that fits in (b)
   b. add BTT entries for sector number translation to map (o1*) onto (b)
   c. set the Progress value in the re-partitioning control structure RCS to 1
   d. calculate the CRC Checksum value and the HMAC (if applicable)
   e. store the re-partitioning control structure RCS and a copy of the re-partitioning control structure RCS (copy) on the flash memory device MD in partition P3
3. If Progress <2, then:
   a. copy content of (b) to (t1*), with (t1*) being the first part of (t1) that fits in (b)
   b. update the BTT entries for sector number translation to map (o1*) onto (t1*)
   c. set the Progress value in the re-partitioning control structure RCS to 2
   d. calculate the CRC Checksum value and the HMAC (if applicable)

e. store the updated re-partitioning control structure RCS and a copy of the updated re-partitioning control structure RCS (copy) on the flash memory device MD in partition P3

4. If Progress <3, then:
   a. copy content of (o1') to (b), with (o1') being the second remaining part of (o1)
   b. add BTT entries for sector number translation to map (o1') onto (b)
   c. set the Progress value in the re-partitioning control structure RCS to 3
   d. calculate the CRC Checksum value and the HMAC (if applicable)
   e. store the updated re-partitioning control structure RCS and a copy of the updated re-partitioning control structure RCS (copy) on the flash memory device MD in partition P3

5. If Progress <4, then:
   a. copy content of (b) to (t1'), with (t1') being the second remaining part of (t1)
   b update BTT entries for sector number translation to map (o1') onto (t1')
   c. set the Progress value in the re-partitioning control structure RCS to 4
   d. calculate the CRC Checksum value and the HMAC (if applicable)
   e. store the updated re-partitioning control structure RCS and a copy of the updated re-partitioning control structure RCS (copy) on the flash memory device MD in partition P3

6. If Progress <5, then:
   a. copy content of (o2) to (b)
   b. add BTT entries for sector number translation to map (o2) onto (b)
   c. set the Progress value in the re-partitioning control structure RCS to 5
   d. calculate the CRC Checksum value and the HMAC (if applicable)
   e. store the updated re-partitioning control structure RCS and a copy of the updated re-partitioning control structure RCS (copy) on the flash memory device MD in partition P3

7. If Progress <6, then:
   a. copy content of (b) to (t2)
   b. update BTT entries for sector number translation to map (o2) onto (t2)
   c. set the Progress value in the re-partitioning control structure RCS to 6
   d. calculate the CRC Checksum value and the HMAC (if applicable)
   e. store the updated re-partitioning control structure RCS and a copy of the updated re-partitioning control structure RCS (copy) on the flash memory device MD in partition P3

It is to be noted that with regard to activity e. in steps 2 to 7, in the described implementation the expectation is that no specific handling for ensuring atomic updates of RCS and RCS (copy) on the flash memory device is needed. If an error or power failure would occur during storage of one of the RCS instances on the flash memory device, then this RCS instance would anyhow be rated as invalid when resuming the re-partitioning sequence, as the CRC and/or HMAC check would fail. In an alternative approach, for explicitly protecting RCS updates on the flash memory device the Status for an RCS instance is first set to "invalid" and stored it on the flash memory device. Then the RCS content is updated as needed. Finally, the Status is set to "valid" and stored on the flash memory device. Afterwards, the same is done for RCS (copy).

At this step, all data relocations have been completed, including relocation of the copies of the partition tables GPT as resulting from re-partitioning. The actual contents of the copies of the partition tables GPT have not yet been touched, i.e. the original contents of all partition tables GPT and their copies GPT (copy) together with the two identical copies of the re-partitioning control structure RCS, RCS (copy) will correctly point to any data on the flash memory device MD.

For updating contents of the partition tables GPT, as required by re-partitioning, the following approach is used, which for recovery reasons ensures that always a valid pair of partition table GPT and re-partitioning control structure RCS is stored on the flash memory device MD. Therefore, each partition table GPT is linked to a re-partitioning control structure RCS and each copy of a partition table GPT (copy) is linked to a copy of the re-partitioning control structure RCS (copy).

It is to be noted that this kind of linking could in principle always be applied, i.e. also during the data copying steps. The approach would then be in general as follows. If a re-partitioning control structure RCS is set to "invalid", then always the copy of this a re-partitioning control structure RCS (copy) will be used together with the copy of the partition table GPT (copy). Otherwise, if a copy of a re-partitioning control structure RCS (copy) is set to "invalid", then always the corresponding re-partitioning control structure RCS will be used together with the partition table GPT. This approach is still be able to handle single faults of the flash memory device MD.

8. If Progress <7, then:
   a. set the Status value in the re-partitioning control structure RCS to "invalid"
   b. calculate the CRC Checksum value and the HMAC (if applicable)
   c store the updated re-partitioning control structure RCS on the flash memory device MD in partition P3
   d. store all modified partition table GPT for the new target partitioning, which have been compiled into the managing software component, in their target location on the flash memory device MD
   e. set the Progress value in the re-partitioning control structure RCS to 7 and set the Status value to "valid"
   f. calculate the CRC Checksum value and the HMAC (if applicable)
   g. store the updated re-partitioning control structure RCS on the flash memory device MD in partition P3

9. If Progress <8, then:
   a. set the Status value in the copy of the re-partitioning control structure RCS (copy) to "invalid"
   b. calculate the CRC Checksum value and the HMAC (if applicable)
   c. store the updated copy of the re-partitioning control structure RCS (copy) on the flash memory device MD in partition P3
   d. store all modified copies of the partition tables GPT (copy) for the new target partitioning, which have been compiled into the managing software component, in their target location on the flash memory device MD
   e. set the Progress value in the copy of the re-partitioning control structure RCS (copy) to 8 and set the Status value to "valid"
   f. calculate the CRC Checksum value and HMAC (if applicable)

g. store the updated copy of the re-partitioning control structure RCS (copy) on the flash memory device MD in partition P3

10. If progress <9, then
   a. Mark the re-partitioning task as completed in both copies of the re-partitioning control structure RCS, RCS (copy) by setting the Status value to "completed" and set the Progress value to 9
   b. calculate the CRC Checksum value and HMAC (if applicable)
   c. store the updated re-partitioning control structure RCS and a copy of the updated re-partitioning control structure RCS (copy) on the flash memory device MD in partition P3

At this step, the re-partitioning task has been successfully completed. The re-partitioning control structure RCS and the copy of the re-partitioning control structure RCS (copy) will remain stored on the flash memory device MD in partition P3. In this embodiment, the partition P3 will next be used by a subsequent software update cycle. For this newly updated software, the managing software component will usually no longer look for a re-partitioning control structure RCS as it will not repartition the flash memory device MD again. Therefore, it is not an issue if the re-partitioning control structure RCS and the copy of the re-partitioning control structure RCS (copy) are overwritten within a following software update cycle.

Alternatively, also a dedicated location on the flash memory device can be allocated to keep track of ongoing or completed repartitioning tasks, the currently applied version of flash partitioning, or similar information from which it can be concluded whether a re-partitioning task has already been completed.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, systems on a chip, microcontrollers, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a combination of circuit elements that performs that function or software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

FIG. 1 schematically illustrates a method according to the invention for re-partitioning a flash memory device. For example, the flash memory device may be a managed NAND device, e.g. an embedded Multi-Media Card flash device. In a first step, a software component responsible for re-partitioning is received S1. The software component then generates S2 a re-partitioning control structure in the flash memory device and executes S3 re-partitioning steps. The re-partitioning control structure may be protected by a keyed-hash message authentication code. Advantageously, two copies of the re-partitioning control structure are generated in the flash memory device. The re-partitioning steps, which may comprise copying data from an original location to a buffer, copying data from the buffer to a target location, and updating content of a partition table, for example, are preferably executed S3 as a background task or in an initialization function of the software component. The executed re-partitioning steps and currently valid locations of data that needs to be moved in the flash memory device during re-partitioning are recorded S4 in the re-partitioning control structure. For example, the currently valid locations may be recorded in a block translation table of the re-partitioning control structure, which comprises information for translating a first range of logical blocks as described by an entry of a partition table to a second range of logical blocks that will be used by a low-layer driver of the flash memory device for actual flash accesses while a re-partitioning sequence is ongoing. The first range of logical blocks and the second range of logical blocks may be located in different physical partitions of the flash memory device. Advantageously, the software component responsible for re-partitioning includes partition tables that need to be replaced. If necessary, these partition tables may be signed.

FIG. 2 schematically illustrates a block diagram of a first embodiment of an apparatus 20 according to the invention for re-partitioning a flash memory device MD. For example, the flash memory device MD may be a managed NAND device, e.g. an embedded Multi-Media Card flash device. The apparatus 20 has a first interface 21, via which an input module 22 receives a software component SW responsible for re-partitioning. The apparatus 20 further has a re-partitioning module 23 configured to execute re-partitioning steps. Preferably, the re-partitioning module 23 is configured to execute the re-partitioning steps, which may comprise copying data from an original location to a buffer, copying data from the buffer to a target location, and updating content of a partition table, for example, as a background task or in an initialization function of the software component SW. A re-partitioning control module 24 is configured to generate a re-partitioning control structure in the flash memory device MD and to record the executed re-partitioning steps and currently valid locations of data that needs to be moved in the flash memory device MD during re-partitioning in the re-partitioning control structure. For example, the currently valid locations may be recorded in a block translation table of the re-partitioning control structure, which comprises information for translating a first range of logical blocks as described by an entry of a partition table to a second range of logical blocks that will be used by a low-layer driver of the flash memory device MD for actual flash accesses while a re-partitioning sequence is ongoing. The first range of logical blocks and the second range of logical blocks may be located in different physical partitions of the flash memory device MD. Advantageously, the software component SW responsible for re-partitioning includes partition tables that need to be replaced. If necessary, these partition tables may be signed. The re-partitioning control structure may be protected by a keyed-hash message authentication code. Advantageously, the re-partitioning control module 24 is configured to generate two copies of the re-partitioning control structure in the flash memory device MD. In this example, the re-partitioning module 23 and the re-partitioning control module 24 access the flash memory device MD via a second interface 27. The first interface 21 may also be combined with the second interface 27 into a single interface. A local storage unit 26 is provided, e.g. for storing data during processing.

The input module 22, the re-partitioning module 23, and the re-partitioning control module 24 may be controlled by a control module 25. A user interface 28 may be provided for enabling a user to modify settings of the various modules 22-25. The modules 22-25 of the apparatus 20 can be embodied as dedicated hardware units. Of course, they may likewise be fully or partially combined into a single unit or implemented as software running on a processor, e.g. a CPU or a GPU.

A block diagram of a second embodiment of an apparatus 30 according to the invention for re-partitioning a flash memory device is illustrated in FIG. 3. The apparatus 30 comprises a processing device 32 and a memory device 31. For example, the apparatus 30 may be a computer, an electronic control unit or an embedded system. The memory device 31 has stored instructions that, when executed by the processing device 32, cause the apparatus 30 to perform steps according to one of the described methods. The instructions stored in the memory device 31 thus tangibly embody a program of instructions executable by the processing device 32 to perform program steps as described herein according to the present principles. The apparatus 30 has an input 33 for receiving data. Data generated by the processing device 32 are made available via an output 34. In addition, such data may be stored in the memory device 31. The input 33 and the output 34 may be combined into a single bidirectional interface.

The processing device 32 as used herein may include one or more processing units, such as microprocessors, digital signal processors, or a combination thereof.

The local storage unit 26 and the memory device 31 may include volatile and/or non-volatile memory regions and storage devices such as hard disk drives, optical drives, and/or solid-state memories.

FIG. 4 schematically shows a motor vehicle 40, in which a solution in accordance with the invention is implemented. The motor vehicle 40 has an autonomous driving controller 41, a navigation system 42 and an infotainments system 43, which in this example all have an embedded flash memory device MD. For each flash memory device MD, a dedicated apparatus 20 for re-partitioning the flash memory device MD is provided. By means of a data transmission unit 44, a connection to a backend 50 can be established, e.g. to receive a software component SW responsible for re-partitioning. A memory 45 is available for storing data. The data exchange between the different components of the motor vehicle 40 takes place via a network 46.

In the following, further details of the invention shall be given with reference to FIG. 5 to FIG. 8.

FIG. 5 schematically illustrates a currently applied partitioning of a flash memory device MD as used by a running system. The depicted flash memory device MD has two physical partitions, i.e., a boot partition BP and a user partition UP. Of course, further physical partitions may be present. The user partition UP is further partitioned by software in three software partitions P1-P3, which may each be assigned to a virtual machine in a virtualized environment. As shown for the first two software partitions P1, P2, the software partitions may be further partitioned into sub-partitions. The third software partition P3 may, for example, serve as an update partition that is only temporarily used for storage during a software update cycle. Each physical partition BP, UP has a corresponding partition table GPT at its beginning and a copy of that partition table GPT at its end, which specify the content/layout of each partition BP, UP. If software partitions P1, P2 within a physical partition UP are further sub-partitioned, then again each of those software partitions P1, P2 has a corresponding partition table GPT at its beginning and a copy of that partition table GPT at its end, describing the content/layout of the sub-partitioned partition P1, P2.

FIG. 6 schematically illustrates locations of a re-partitioning control structure RCS and a buffer BUF used during re-partitioning of the flash memory device MD of FIG. 5. During re-partitioning, a certain amount of data on the flash memory device MD needs to be transferred from an original location to a target location. Such data may be actual content of a partition or an instance of a partition table GPT.

As shown in FIG. 6, the third software partition P3, which is only temporarily used as a software update partition, may be used to store the re-partitioning control structure RCS and a copy of the re-partitioning control structure RCS. The third software partition P3 may further serve as a buffer BUF for data to be relocated while performing re-partitioning. In principle, any free space on the flash memory device MD can be used for this purpose, as long as this space will not be occupied by the re-partitioned layout and as long as the location is known to the software component managing the re-partitioning steps. The size of this free space just needs to be sufficiently large to store two copies of the re-partitioning control structure RCS and to provide a reasonable buffer BUF for transferring data.

It is advantageous to have the data currently being relocated on the flash memory device MD stored in two locations in parallel as well as having two copies of the re-partitioning control structure RCS being stored on the flash memory device MD, as this allows supporting a safe way of recovery, i.e., resuming of an ongoing re-partitioning task that has been interrupted by an error or a power failure.

The actual re-partitioning task is carried out as a sequence of steps that are tracked by the managing software component, e.g., the flash memory device MD server, by means of the re-partitioning control structure RCS. Several sub-functions used within these steps can be distinguished, which include starting re-partitioning and initializing data structures, copying data from the original location to the buffer BUF, copying data from the buffer BUF to the target location, updating content of a partition table GPT, and finalizing re-partitioning. Copying data and updating content of a partition table GPT may need to be executed several times, depending on the available size of the buffer BUF and on the amount of data that needs to be changed or relocated.

FIG. 7 schematically illustrates an example of layout and content of the re-partitioning control structure RCS. The re-partitioning control structure RCS begins with a magic pattern, followed by information on the version and the size of the re-partitioning control structure RCS. A Status indicator is used for specifying whether the re-partitioning control structure RCS is valid or invalid. A Progress counter is used for tracking progress of the re-partitioning operation. A number of BTT entries are used for defining a mapping or block translation. Each BTT entry designates a range of subsequent flash block addresses, e.g., sector numbers, from BTT Original_Start_Location[i] up to and including Original_End_Location[i] and its translation to a range of subsequent flash block addresses of the same size, starting from BTT Mapped_Start_Location[i]. Basically, the BTT entries translate a range of logical blocks/sectors as described by an entry of a partition table to another range of sectors that will be used by a low-layer driver of the flash memory device for actual flash accesses. One purpose of the block translation table BTT is to allow intermediate storage of data to be moved on the flash memory device because the new target location is not free and a direct transfer to the target location is not possible. The re-partitioning control structure RCS ends with a cyclic redundancy check (CRC) checksum. Optionally, for security reasons the re-partitioning control structure RCS may be protected by a keyed-hash message authentication code (HMAC).

In the following, the re-partitioning steps to be carried out by the managing software component are described in more detail for an exemplary re-partitioning operation, which is schematically illustrated in FIG. 8. The task is to increase the size of partition X. In order to make space available for the increased partition X, the sizes of partitions Y and Z need to be decreased to the size indicated by the dashed rectangles. Obviously, the partitions Y and Z are considered to contain unused space, allowing reducing their sizes. In the described example, the software update partition P3 will be used to store the two copies of the re-partitioning control structure RCS and as buffer BUF for relocating flash content, where (b) in FIG. 8 designates the remaining available space in partition P3 usable as buffer BUF.

During re-partitioning, the managing software component can work with a working copy of the re-partitioning control structure RCS in RAM to reduce flash read and write accesses, but actual flash accesses are needed when the re-partitioning control structure RCS and/or the copy of the re-partitioning control structure RCS have to be written to the flash memory device MD, if required and stated in the steps below. Furthermore, the re-partitioning control structure RCS and the copy of the re-partitioning control structure RCS need to be read from the flash memory device MD whenever re-partitioning shall be started or resumed, e.g., after interruption due to an error or power failure, in order to obtain the latest up-to-date state persisting on the flash memory device MD.

Whenever the re-partitioning control structure RCS and the copy of the re-partitioning control structure RCS are read from the flash memory device MD, both copies are checked for integrity. This includes checking for a valid magic pattern and version of the re-partitioning control structure RCS, validation of the CRC checksum and HMAC validation, if applied. In case both copies are valid and for both the Status value is set to "valid", then the copy with the higher value of the Progress counter is used.

If a reset or power failure happens during any of the following steps, then the re-partitioning control structure RCS and the copy of the re-partitioning control structure RCS will be read from the flash memory device MD and evaluated as described above. Then the re-partitioning sequence will be continued according to the saved Progress value.

In the present exemplary embodiment, the managing software component implements the following re-partitioning steps:

1. Start or resume re-partitioning task if not already completed:
   a. if at least one of the copies of the re-partitioning control structure RCS has been successfully validated and its status value is set to "completed", then skip all further steps
   b. if no re-partitioning control structure RCS was found on the flash memory device, or if none of the copies of the re-partitioning control structure RCS that have been found has been successfully validated, then create an initial re-partitioning control structure RCS (in RAM) with an empty block translation table, the Progress value set to 0, and the Status value set to "valid"
   c. if at least one of the copies of the re-partitioning control structure RCS has been successfully validated and its status value is set to "valid", then use the RCS values of the RCS instance with the higher Progress value; continue with next step (step 2).
2. If Progress <1, then:
   a. copy content of (o1*) to (b), with (o1*) being the first part of (o1) that fits in (b)
   b. add BTT entries for sector number translation to map (o1*) onto (b)
   c. set the Progress value in the re-partitioning control structure RCS to 1
   d. calculate the CRC Checksum value and the HMAC (if applicable)
   e. store the re-partitioning control structure RCS and a copy of the re-partitioning control structure RCS (copy) on the flash memory device MD in partition P3
3. If Progress <2, then:
   a. copy content of (b) to (t1*), with (t1*) being the first part of (t1) that fits in (b)
   b. update the BTT entries for sector number translation to map (o1*) onto (t1*)
   c. set the Progress value in the re-partitioning control structure RCS to 2
   d. calculate the CRC Checksum value and the HMAC (if applicable)
   e. store the updated re-partitioning control structure RCS and a copy of the updated re-partitioning control structure RCS (copy) on the flash memory device MD in partition P3

4. If Progress <3, then:
   a. copy content of (o1') to (b), with (o1') being the second remaining part of (o1)
   b. add BTT entries for sector number translation to map (o1') onto (b)
   c. set the Progress value in the re-partitioning control structure RCS to 3
   d. calculate the CRC Checksum value and the HMAC (if applicable)
   e. store the updated re-partitioning control structure RCS and a copy of the updated re-partitioning control structure RCS (copy) on the flash memory device MD in partition P3
5. If Progress <4, then:
   a. copy content of (b) to (t1'), with (t1') being the second remaining part of (t1)
   b update BTT entries for sector number translation to map (o1') onto (t1')
   c. set the Progress value in the re-partitioning control structure RCS to 4
   d. calculate the CRC Checksum value and the HMAC (if applicable)
   e. store the updated re-partitioning control structure RCS and a copy of the updated re-partitioning control structure RCS (copy) on the flash memory device MD in partition P3
6. If Progress <5, then:
   a. copy content of (o2) to (b)
   b. add BTT entries for sector number translation to map (o2) onto (b)
   c. set the Progress value in the re-partitioning control structure RCS to 5
   d. calculate the CRC Checksum value and the HMAC (if applicable)
   e. store the updated re-partitioning control structure RCS and a copy of the updated re-partitioning control structure RCS (copy) on the flash memory device MD in partition P3
7. If Progress <6, then:
   a. copy content of (b) to (t2)
   b. update BTT entries for sector number translation to map (o2) onto (t2)
   c. set the Progress value in the re-partitioning control structure RCS to 6
   d. calculate the CRC Checksum value and the HMAC (if applicable)
   e. store the updated re-partitioning control structure RCS and a copy of the updated re-partitioning control structure RCS (copy) on the flash memory device MD in partition P3

It is to be noted that with regard to activity e. in steps 2 to 7, in the described implementation the expectation is that no specific handling for ensuring atomic updates of RCS and RCS (copy) on the flash memory device is needed. If an error or power failure would occur during storage of one of the RCS instances on the flash memory device, then this RCS instance would anyhow be rated as invalid when resuming the re-partitioning sequence, as the CRC and/or HMAC check would fail. In an alternative approach, for explicitly protecting RCS updates on the flash memory device the Status for an RCS instance is first set to "invalid" and stored it on the flash memory device. Then the RCS content is updated as needed. Finally, the Status is set to "valid" and stored on the flash memory device. Afterwards, the same is done for RCS (copy).

At this step, all data relocations have been completed, including relocation of the copies of the partition tables GPT as resulting from re-partitioning. The actual contents of the copies of the partition tables GPT have not yet been touched, i.e. the original contents of all partition tables GPT and their copies GPT (copy) together with the two identical copies of the re-partitioning control structure RCS, RCS (copy) will correctly point to any data on the flash memory device MD.

For updating contents of the partition tables GPT, as required by re-partitioning, the following approach is used, which for recovery reasons ensures that always a valid pair of partition table GPT and re-partitioning control structure RCS is stored on the flash memory device MD. Therefore, each partition table GPT is linked to a re-partitioning control structure RCS and each copy of a partition table GPT (copy) is linked to a copy of the re-partitioning control structure RCS (copy).

It is to be noted that this kind of linking could in principle always be applied, i.e. also during the data copying steps. The approach would then be in general as follows. If a re-partitioning control structure RCS is set to "invalid", then always the copy of this a re-partitioning control structure RCS (copy) will be used together with the copy of the partition table GPT (copy). Otherwise, if a copy of a re-partitioning control structure RCS (copy) is set to "invalid", then always the corresponding re-partitioning control structure RCS will be used together with the partition table GPT. This approach is still be able to handle single faults of the flash memory device MD.

8. If Progress <7, then:
   a. set the Status value in the re-partitioning control structure RCS to "invalid"
   b. calculate the CRC Checksum value and the HMAC (if applicable)
   c store the updated re-partitioning control structure RCS on the flash memory device MD in partition P3
   d. store all modified partition table GPT for the new target partitioning, which have been compiled into the managing software component, in their target location on the flash memory device MD
   e. set the Progress value in the re-partitioning control structure RCS to 7 and set the Status value to "valid"
   f. calculate the CRC Checksum value and the HMAC (if applicable)
   g. store the updated re-partitioning control structure RCS on the flash memory device MD in partition P3
9. If Progress <8, then:
   a. set the Status value in the copy of the re-partitioning control structure RCS (copy) to "invalid"
   b. calculate the CRC Checksum value and the HMAC (if applicable)
   c. store the updated copy of the re-partitioning control structure RCS (copy) on the flash memory device MD in partition P3
   d. store all modified copies of the partition tables GPT (copy) for the new target partitioning, which have been compiled into the managing software component, in their target location on the flash memory device MD
   e. set the Progress value in the copy of the re-partitioning control structure RCS (copy) to 8 and set the Status value to "valid"
   f. calculate the CRC Checksum value and HMAC (if applicable)
   g. store the updated copy of the re-partitioning control structure RCS (copy) on the flash memory device MD in partition P3
10. If progress <9, then
    a. Mark the re-partitioning task as completed in both copies of the re-partitioning control structure RCS, RCS (copy) by setting the Status value to "completed" and set the Progress value to 9 b. calculate the CRC Checksum value and HMAC (if applicable)

c. store the updated re-partitioning control structure RCS and a copy of the updated re-partitioning control structure RCS (copy) on the flash memory device MD in partition P3

At this step, the re-partitioning task has been successfully completed. The re-partitioning control structure RCS and the copy of the re-partitioning control structure RCS (copy) will remain stored on the flash memory device MD in partition P3. In this embodiment, the partition P3 will next be used by a subsequent software update cycle. For this newly updated software, the managing software component will usually no longer look for a re-partitioning control structure RCS as it will not repartition the flash memory device MD again. Therefore, it is not an issue if the re-partitioning control structure RCS and the copy of the re-partitioning control structure RCS (copy) are overwritten within a following software update cycle.

Alternatively, also a dedicated location on the flash memory device can be allocated to keep track of ongoing or completed repartitioning tasks, the currently applied version of flash partitioning, or similar information from which it can be concluded whether a re-partitioning task has already been completed.

The invention claimed is:

1. A method for re-partitioning a flash memory device, the method comprising:
   receiving a software component responsible for re-partitioning;
   generating a re-partitioning control structure in the flash memory device;
   executing re-partitioning steps; and
   recording the executed re-partitioning steps and currently valid locations of data that needs to be moved in the flash memory device during re-partitioning in the re-partitioning control structure, wherein the currently valid locations are recorded in a block translation table of the re-partitioning control structure, and wherein the block translation table comprises information for translating a first range of logical blocks as described by an entry of a partition table to a second range of logical blocks that will be used by a low-layer driver of the flash memory device for actual flash accesses while a re-partitioning sequence is ongoing.

2. The method according to claim 1, wherein the re-partitioning steps that are executed comprise copying data from an original location to a buffer, copying data from the buffer to a target location, and updating content of a partition table.

3. The method according to claim 1, wherein two copies of the re-partitioning control structure are generated in the flash memory device.

4. The method according to claim 1, wherein the first range of logical blocks and the second range of logical blocks are located in different physical partitions of the flash memory device.

5. The method according to claim 1, wherein the re-partitioning steps are executed as a background task or in an initialization function of the software component.

6. The method according to claim 1, wherein the re-partitioning control structure is protected by a keyed-hash message authentication code.

7. The method according to claim 1, wherein the software component responsible for re-partitioning includes partition tables that need to be replaced.

8. The method according to claim 7, wherein the partition tables are signed.

9. The method according to claim 1, wherein the flash memory device is a managed NAND flash device.

10. The method according to claim 9, wherein the flash memory device is an embedded Multi-Media Controller flash device.

11. An apparatus for re-partitioning a flash memory device, the apparatus comprising:
    an interface configured to receive a software component responsible for re-partitioning; and
    a processing device configured to generate a re-partitioning control structure in the flash memory device, to execute re-partitioning steps, and to record the executed re-partitioning steps and currently valid locations of data that needs to be moved in the flash memory device during re-partitioning in the re-partitioning control structure, wherein the currently valid locations are recorded in a block translation table of the re-partitioning control structure, and wherein the block translation table comprises information for translating a first range of logical blocks as described by an entry of a partition table to a second range of logical blocks that will be used by a low-layer driver of the flash memory device for actual flash accesses while a re-partitioning sequence is ongoing.

12. The apparatus according to claim 11, wherein the re-partitioning steps that are executed comprise copying data from an original location to a buffer, copying data from the buffer to a target location, and updating content of a partition table.

13. The apparatus according to claim 11, wherein two copies of the re-partitioning control structure are generated in the flash memory device.

14. The apparatus according to claim 11, wherein the first range of logical blocks and the second range of logical blocks are located in different physical partitions of the flash memory device.

15. The apparatus according to claim 11, wherein the re-partitioning steps are executed as a background task or in an initialization function of the software component.

16. The apparatus according to claim 11, wherein the re-partitioning control structure is protected by a keyed-hash message authentication code.

17. The apparatus according to claim 11, wherein the software component responsible for re-partitioning includes partition tables that need to be replaced.

18. The apparatus according to claim 17, wherein the partition tables are signed.

19. The apparatus according to claim 11, wherein the flash memory device is a managed NAND flash device.

20. The apparatus according to claim 19, wherein the flash memory device is an embedded Multi-Media Controller flash device.

* * * * *